C. AYO.
FAUCET.
APPLICATION FILED DEC. 30, 1908.

952,865.

Patented Mar. 22, 1910.

UNITED STATES PATENT OFFICE.

CLERFÉ AYO, OF BOWIE, LOUISIANA.

FAUCET.

952,865.   Specification of Letters Patent.   Patented Mar. 22, 1910.

Application filed December 30, 1908. Serial No. 469,921.

*To all whom it may concern:*

Be it known that I, CLERFÉ AYO, a citizen of the United States, residing at Bowie, in the parish of Lafourche and State of Louisiana, have invented a new and useful Faucet, of which the following is a specification.

The faucet which is the subject of the present invention is intended, primarily, for use in connection with barrels or tanks, and the object of the invention is to provide a faucet of this kind which is simple in structure, and which effectually serves to shut off the liquid or other contents of the barrel or tank.

A further object of the invention is to provide a novel and improved valve structure, and also one which is readily accessible, thus enabling the valve and its seat to be easily and quickly repaired.

The invention also has for its object certain improvements in the body of the faucet, whereby it may be readily connected to the barrel or tank.

With the foregoing objects in view, as well as others which will be apparent when the invention is better understood, the same consists in a novel construction and arrangement of parts, to be hereinafter described and claimed, reference being had to the drawings hereto annexed, in which:—

Figure 1:
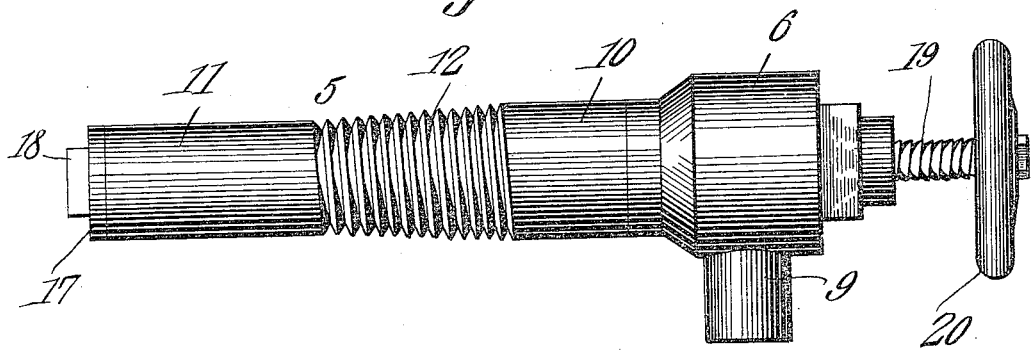
Figure 2:
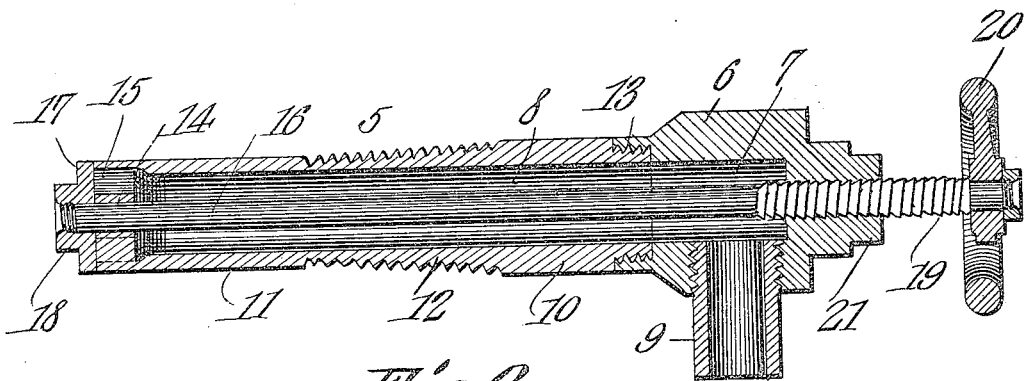

Figure 1 is a side elevation of the faucet; Fig. 2 a longitudinal sectional view thereof.

The body of the faucet comprises a barrel 5, and a head 6, provided with a chamber 7, communicating with the bore 8 of the barrel, and having on one side a threaded opening into which is screwed a discharge spout 9, which communicates with the chamber 7.

The barrel 5 comprises end sections 10 and 11, respectively, of different diameters, and an intermediate, tapered and threaded section 12. The section 10 has a reduced threaded end 13, which screws into a threaded counterbore of the chamber 7. The threaded section 12 is for the purpose of connecting the faucet to the barrel or tank, it being screwed into an opening therein. By this means a simple and convenient connection with the barrel or tank is made.

The outer end of the section 11 is flat and carefully ground perfectly smooth to form a valve seat. Said valve seat is provided with a central opening 14 and a series of openings 15 surrounding the same. The first mentioned opening receives the stem 16 of a valve 17, which is engageable with the seat hereinbefore referred to. The valve is a disk having its face ground perfectly smooth so as to make a tight joint with the seat. The openings 15 communicate with the bore of the barrel 5 and are controlled by the valve, they being covered and uncovered thereby when the stem 16 is operated, said stem being connected to the valve by being screwed into a central threaded opening therein. The back of the valve 17 is provided with an angular lug to facilitate the application of a wrench for assembling said valve on the stem.

The valve stem extends lengthwise through the barrel of the faucet, and has a screw-threaded portion 19, which works in a threaded opening made in the end of the head 6, and said stem projects from said head and has its end fitted with a hand-wheel 20, whereby it is actuated to operate the valve, it being understood that when the valve stem is rotated it will be given a longitudinal movement by the threads 19, and which movement of the stem serves to seat or unseat the valve.

The outer end of the head is formed with an angular portion 21, to which a wrench may be applied when the faucet is screwed into the barrel or tank.

It will be seen, from the foregoing, that I have provided a faucet which is simple in structure, and in which the valve is so arranged that it is readily accessible for repair, and the various parts constituting the faucet may be readily assembled, and the valve structure results in an effective shut-off.

The faucet drains itself when closed, which, together with the fact that it extends into the tank, makes it non-freezable.

What is claimed is:—

In a faucet, a body comprising a barrel and a hollow head, the head and barrel being separably connected, and the head having a threaded opening at one end, and a threaded counterbore at the opposite end, and an outlet between said ends, and the barrel having end sections of different diameters, and an intermediate threaded and tapering portion, one of said end sections having a reduced threaded portion screwing into the aforesaid counterbore, and the other section having an exterior valve seat formed with a central opening and a plurality of openings therearound, a valve comprising a disk having a ground face engageable with the seat, and provided with a central screw threaded opening, and the back of the disk having an angular lug, and a valve operating stem screwed into the threaded opening of the valve disk, and extending lengthwise through the barrel and head, and through the central opening in the valve seat, and the aforesaid threaded opening of the head, said stem being formed with screw-threads engageable with the threads of the last-mentioned opening.

In testimony that I claim the foregoing as my own, I have hereto affixed my signature in the presence of two witnesses.

CLERFÉ AYO

Witnesses:
SIMON ABRAHAM,
SIMON KALM.